United States Patent
Holl et al.

(10) Patent No.: US 7,129,002 B2
(45) Date of Patent: Oct. 31, 2006

(54) METHOD FOR PRODUCING A RECHARGEABLE ELECTROCHEMICAL ELEMENT

(75) Inventors: Konrad Holl, Aalen-Dewangen (DE); Arno Perner, Ellwangen (DE); Horst Wagner, Rosenberg (DE); Rolf Hennrich, Ellwangen (DE); Dejan Ilic, Ellwangen (DE)

(73) Assignee: Varta Microbattery GmbH (DE)

( * ) Notice: Subject to any disclaimer, the term of this patent is extended or adjusted under 35 U.S.C. 154(b) by 286 days.

(21) Appl. No.: 10/424,875

(22) Filed: Apr. 28, 2003

(65) Prior Publication Data
US 2003/0213120 A1 Nov. 20, 2003

(30) Foreign Application Priority Data
May 2, 2002 (DE) ................ 102 19 425

(51) Int. Cl.
*H01M 4/58* (2006.01)
(52) U.S. Cl. ................ 429/218.1; 429/231.9; 429/231.95
(58) Field of Classification Search ............ 429/218.1, 429/231.9, 231.95
See application file for complete search history.

(56) References Cited

U.S. PATENT DOCUMENTS

| | | | |
|---|---|---|---|
| 4,717,634 A | 1/1988 | Daifuku et al. | |
| 4,865,932 A | 9/1989 | Masuda et al. | |
| 6,022,640 A | 2/2000 | Takuda et al. | |
| 6,165,646 A | 12/2000 | Takada et al. | |
| 6,221,530 B1 * | 4/2001 | Turner et al. | ........ 429/229 |
| 6,274,277 B1 * | 8/2001 | Mori et al. | ........ 429/307 |
| 6,352,796 B1 | 3/2002 | Takada et al. | |
| 6,428,935 B1 * | 8/2002 | Takada et al. | ........ 429/231.95 |
| 2005/0069776 A1 * | 3/2005 | Holl et al. | ........ 429/231.95 |

FOREIGN PATENT DOCUMENTS

| | | | |
|---|---|---|---|
| DE | 3128863 | * | 2/1983 |
| DE | 38 16 199 A1 | | 1/1988 |
| JP | 61193360 | | 8/1986 |
| JP | 01048369 | | 2/1989 |
| JP | 05182693 | | 7/1993 |

* cited by examiner

*Primary Examiner*—Dah-Wei Yuan
(74) *Attorney, Agent, or Firm*—DLA Piper US LLP

(57) ABSTRACT

A method for producing a rechargeable button cell having a negative electrode composed of a lithium/indium alloy, a positive lithium/intercalating electrode and an organic electrolyte, a lithium layer and an indium layer are introduced into a negative housing half-section. The positive electrode material is introduced into a positive housing half-section. The two housing half-sections are beaded to form the button cell once the organic electrolyte has been added and a separator has been placed in between, with a seal being inserted between the housing half-sections. A lithium-indium alloy is formed from the lithium layer and the indium layer by storage or a subsequent charging/discharge cycle.

10 Claims, 1 Drawing Sheet

METHOD FOR PRODUCING A RECHARGEABLE ELECTROCHEMICAL ELEMENT

RELATED APPLICATION

This application claims priority of German Patent Application No. 10219425.4 filed May 2, 2002.

FIELD OF THE INVENTION

This invention relates to a method for producing a rechargeable electrochemical element, in particular, in the form of a button cell with a negative electrode composed of a lithium/indium alloy, a positive lithium-intercalating electrode and an organic electrolyte. The invention also relates to the resulting electrochemical element.

BACKGROUND

One problem that occurs when using lithium as the negative electrode material in rechargeable electro-chemical elements is that lithium forms dendrites during charging and discharging. Thus, in electrochemical elements such as these, lithium/aluminium alloys or lithium/indium alloys are used as the active negative electrode material. DE 3816199 A1 discloses that the negative electrode can be in the form of a two-layered structure and comprises a layer of a lithium/aluminium alloy and a layer of aluminium.

It would accordingly be advantageous to simplify the production process for such electrochemical elements and, in particular, production of the negative electrode of the element.

SUMMARY OF THE INVENTION

The invention relates to a method for producing a rechargeable electrochemical element, having a negative electrode composed of a lithium/indium alloy, a positive electrode composed of lithium/intercalating material, an organic electrolyte, a positive housing half-section, a negative housing half-section, a separator and a seal between the housing half-sections, comprising introducing an indium layer and a lithium layer into the negative housing half-section; introducing the positive electrode into the positive housing half-section; introducing the organic electrolyte and the separator in the housing half-sections; inserting the seal into one of the housing half-sections; and sealingly joining the housing half-sections together to enable formation of the lithium/indium alloy layer from the indium layer and the lithium layer.

DETAILED DESCRIPTION

According to aspects of the invention, a lithium layer and an indium layer are introduced into a negative housing half-section. The positive electrode material is introduced into the associated positive housing half-section. The two housing half-sections are connected or beaded over to form a button cell after adding or feeding in organic electrolyte and after a separator has been placed between, with a seal being inserted between the housing half-sections. A lithium/indium alloy layer is then formed from the lithium and the indium layer by storing or by at least one subsequent charging/discharging cycle.

In one aspect, the lithium layer and the indium layer are introduced or stamped directly into the negative housing half-section from material strips which run from a roll. It is advantageous to introduce or weld an output conductor, for example, in the form of a network into the negative housing half-section before the lithium layer or the indium layer are stamped in.

A method is preferred in which the indium layer is first introduced into the negative housing half-section. However, it is also possible to introduce an indium layer in powder form into the negative housing half-section, and then stamp the lithium strip directly into the negative half-section from the strip running from a roll. It is also possible to apply indium powder to a lithium film or to apply the indium electrochemically to the negative housing half-section which forms the cell cover or to a network which is then introduced into the cell cover.

The subject matter of the invention will be explained in more detail in the following text with reference to the drawings.

Figure 1:
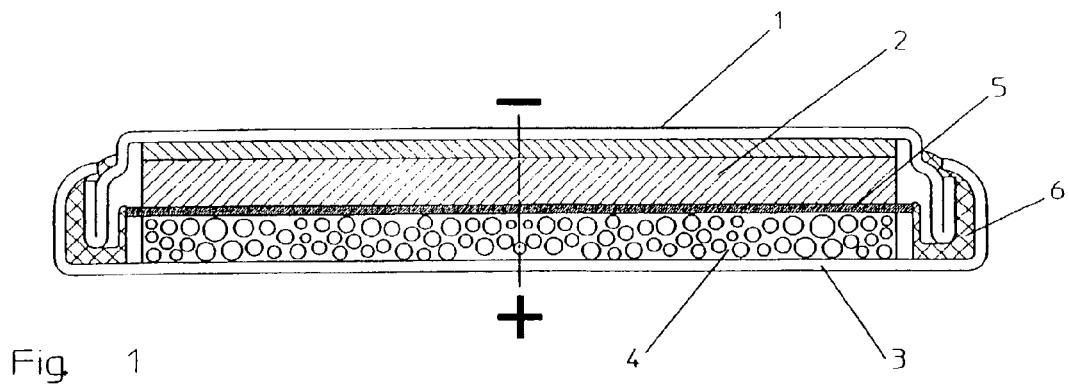
FIG. 1 is a sectional view of a button cell in accordance with aspects of the invention.

FIG. 1 shows, schematically, a button cell according to aspects of the invention. The button cell has a negative housing half-section 1, which in general forms the cell cover of the button cell, and a positive housing half-section 3. The negative housing half-section 1 contains the lithium/indium alloy electrode. The positive housing half-section 3 contains a lithium-intercalating electrode 4, for example, lithiated manganese dioxide $Li_xMnO_2$. A separator 5 is arranged between the positive electrode 4 and the negative electrode 2. The two housing half-sections 1 and 3 are connected to one another by beading 6, with the interposition of the cell.

Figure 2:
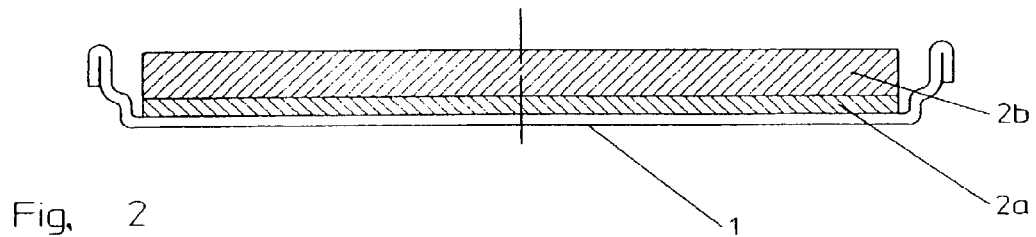
FIG. 2 shows a portion of the button cell from FIG. 1 in an inverted position.

FIG. 2 shows, schematically, a first material layer 2a, namely preferably an indium layer, being arranged in the negative housing half-section 1, with a second material layer 2b, namely the lithium layer, being arranged above it.

Figure 3:
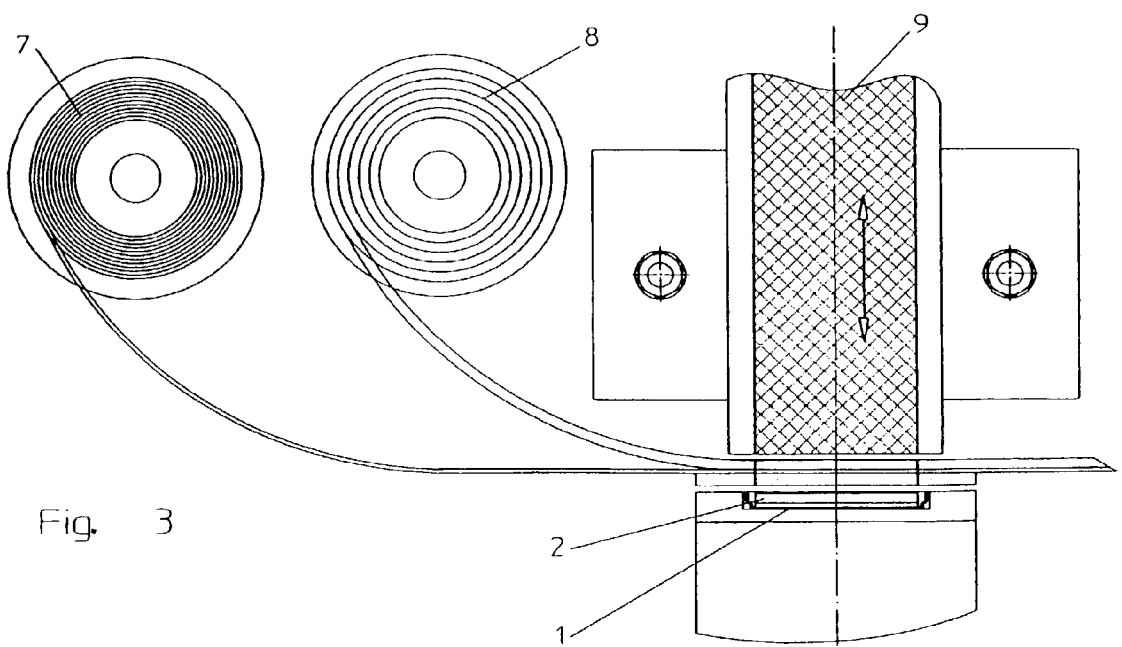
FIG. 3 is a schematic view of selected portions of the production process in accordance with aspects of the invention.

As is shown schematically in FIG. 3, the two material layers 2a and 2b (from FIG. 2) are stamped directly into the negative housing half-section 1 by means of the cutting stamp 9, as endless strip material from the rolls 7 and 8. The bottom of the housing half-section 1 is preferably provided with a welded-in output conductor (not shown). It is preferable for the indium layer 2a from roll 7 to be provided as the lower part of the electrode assembly, followed by the lithium layer 2b from roll 8. Once this process has been completed, the separator 5 is then applied. Electrolyte is added, and the cell cover 1 with the cell cup 3 which contains positive electrode 4 which is likewise impregnated with electrolyte are then joined together.

The lithium/indium alloy is then formed in the cell after assembly, or is formed after the first discharge/charging processes. In the process, the lithium and the indium diffuse into one another, and the desired lithium/indium alloy is formed. Instead of an indium metal film, indium powder can also be pressed into the output conductor mentioned above or directly into the cover, and the lithium can then be stamped in.

It is also possible to introduce the lithium into the negative housing half-section first, and only then to add the indium. The stoichiometry of the lithium/indium alloy can extend from $Li_1In_1$, to $Li_6In_1$. By way of example, the electrode is produced by joining together 500 µm thick lithium films and 200 µm thick indium films in an argon atmosphere, and by stamping them into a cover with an output conductor, at a pressure of 5 bar.

What is claimed is:

1. A method for producing a rechargeable electro-chemical element, having a negative electrode composed of a lithium/indium alloy, a positive electrode composed of lithium/intercalating material, an organic electrolyte, a positive housing half-section, a negative housing half-section, a separator and a seal between the housing half-sections, comprising:

introducing an indium layer and a lithium layer into the negative housing half-section;
   introducing the positive electrode into the positive housing half-section;
   introducing the organic electrolyte and the separator in the housing half-sections;
   inserting the seal into one of the housing half-sections;
   sealingly joining the housing half-sections together; and
   forming the lithium/indium alloy layer from the indium layer and the lithium layer by subjecting the electro-chemical element to a charging/discharging cycle after sealingly joining the housing half-sections together.

2. The method according to claim 1, wherein the indium layer and the lithium layer are formed from rolls of strip materials and are guided directly into the negative housing half-section, and stamped into position.

3. The method according to claim 1, further comprising welding an output conductor into the negative housing half-section before the indium layer and the lithium layer are introduced into the negative housing half-section.

4. The method according to claim 3, wherein the output conductor is in the form of a net-like strip or a web.

5. The method according to claim 3, wherein the output conductor is coated with indium.

6. The method according to claim 5, wherein the output conductor is electrochemically coated with indium.

7. The method according to claim 1, wherein the negative housing half-section is electrochemically coated with indium.

8. The method according to claim 1, wherein the indium layer is introduced into the negative housing half-section, followed by the lithium layer.

9. The method according to claim 1, wherein the indium layer is introduced into the negative housing half-section in powder form, and the lithium layer is then stamped into the negative housing half-section as a lithium strip formed from a roll of strip material.

10. The method according to claim 1, wherein at first the lithium layer is stamped into the negative housing half-section, and the indium layer is then added as indium powder and pressed into the negative housing half-section.

* * * * *